3,193,893
MOLDING PROCESS

Alvan Richard Ross, Plainfield, N.J., and Mortimer Stafford Thompson, North Woodbury, Conn., assignors to Celanese Corporation of America, New York, N.Y., a corporation of Delaware
No Drawing. Filed Oct. 4, 1962, Ser. No. 228,277
8 Claims. (Cl. 22—196)

This invention relates to a method of making improved molds and castings.

It is an object of this invention to provide a method of making improved molds. It is a further object of this invention to provide a process whereby accurate metal castings of relatively complicated shapes may be easily obtained. Other objects will be apparent from the following detailed description and claims.

In accordance with one aspect of the invention, a pattern is first prepared from an oxymethylene polymer, e.g., a shell mold or investment mold is then built up around the oxymethylene polymer pattern by means of appropriate techniques of dip coating, sprinkling and drying using compositions known in the art. The oxymethylene polymer pattern is then removed by heating the mold to a temperature above the combustion temperature of the polymer, during which heating the polymer partially or totally decomposes. Molten metal is then poured into the mold in the usual way to make a finished casting.

Oxymethylene polymers, having successively recurring —$CH_2O$— units have been known for many years. They may be prepared by the polymerization of anhydrous formaldehyde or by the polymerization of trioxane which is a cyclic trimer of formaldehyde.

High molecular weight oxymethylene polymers may be prepared in high yields and at rapid reaction rates by the use of acidic boron fluoride-containing catalysts such as boron fluoride itself, and boron fluoride coordinate complexes with organic compounds in which oxygen or sulfur is the donor atom, as described in U.S. Patents 2,989,506 and 2,989,507 of Hudgin and Berardinelli, the disclosures of which are incorporated herein by reference.

Oxymethylene polymers of improved thermal stability have been prepared by copolymerizing trioxane with from 0.5 to 25. mol percent of a cyclic ether having adjacent carbon atoms. Copolymers of this type are described in Patent No. 3,027,352 of Walling et al., the disclosure of which is incorporated herein by reference. The preferred copolymers are those made up of oxymethylene and oxyethylene groups, such as copolymers of trioxane with dioxolane or with ethylene oxide.

Other methods of preparing oxymethylene polymers are disclosed by Kern et al. in Angewandte Chemie 73 (6), 177–186 (March 21, 1961), including polymers containing repeating carbon-to-carbon single bonds in the polymer chain by copolymerizing trioxane with cyclic ethers such as dioxane, lactones such as betapropiolactone, anhydrides such as cyclic adipic anhydride and ethylenically unsaturated compounds such as styrene, vinyl acetate, vinyl methyl ketone, acrolein, etc.

Also known in the art, e.g., as described in the Kern et al. article cited above, are oxymethylene polymers, the end groups of which are reacted or "capped" with a carboxylic acid, e.g., an alkanoic acid such as acetic acid to form ester end groups or with a monomeric ether, e.g., a dialkyl ether such as dimethyl ether to form ether end groups.

Among the oxymethylene polymers which may be used in this invention are oxymethylene homopolymers, with stabilizing end groups, if desired, and oxymethylene copolymers, e.g., containing carbon-to-carbon bonds in the main polymer chain, particularly copolymers having a recurring structure comprising recurring units having the formula

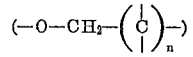

wherein $n$ is an integer from zero to 5 and wherein $n$ is zero in from 75 to 99.6 percent of the recurring units.

A preferred class of copolymers are those having a structure comprising recurring units having the formula (—O—$CH_2$—$(CH_2)_n$—) wherein $n$ is an integer from zero to 5 and wherein $n$ is zero in from 75 to 99.6 percent of the recurring units. The copolymers are prepared by copolymerizing trioxane with a cyclic ether having the structure

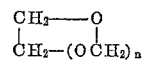

where $n$ is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

It is generally desirable to incorporate one or more thermal stabilizers into the oxymethylene polymer before forming the pattern in order to enhance its thermal stability.

The proportion of stabilizer incorporated into the oxymethylene polymer depends upon the specific stabilizer used. A proportion between about 0.05 and 10 wt. percent (based on the weight of polymer) has been found to be suitable for most stabilizers.

One suitable stabilizer system is a combination of an anti-oxidant ingredient such as a phenolic anti-oxidant and most suitably a substituted bisphenol, and an ingredient to inhibit chain scission, generally a compound or a polymer containing trivalent nitrogen atoms.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(4-methyl-6-tertiary butyl phenol) and 4,4'-butylidene bis-(6-tertiary butyl-3-methyl phenol). Suitable phenolic stabilizers other than alkylene bisphenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrolidone, hydrazides, compounds having 1 to 6 amide groups, proteins, compounds having tertiary amine and terminal amide groups, compounds having amidine groups, cycloaliphatic amine compounds and aliphatic acylureas. Suitable scission inhibitors as well as suitable antioxidants and proportions are disclosed in application Serial No. 826,155 filed by Dolce on July 10, 1959, now Patent No. 3,152,101, application Serial No. 831,-720 filed by Dolce, Berardinelli and Hudgin on August 5, 1959, now Patent No. 3,144,431, application Serial No. 838,427, filed by Berardinelli on September 8, 1959, now abandoned, application Serial No. 838,832, filed by Dolce and Hudgin on September 9, 1959, application Serial No. 841,690, filed by Kray and Dolce on September 23, 1959, now abandoned, application Serial No. 851,560, filed by Berardinelli, Kray and Dolce on November 9, 1959, now abandoned, application Serial No. 1,457, filed by Dolce and Berardinelli on January 11, 1960, now Patent No. 3,133,896, and application Serial No. 4,881, filed by Kray and Dolce on January 27, 1960. The disclosures of the above-mentioned applications are incorporated herein by reference.

The stabilizers may be incorporated into the oxymethylene polymer by dissolving both the polymer and the stabilizer in a common solvent and thereafter evaporating the solution to dryness. Alternatively, the stabilizers may be incorporated into the polymer by applying a solution of the stabilizer to finely divided polymer, as in a slurry, and thereafter filtering the polymer and evaporating to dryness. The stabilizer, in finely divided dry state may be blended into finely divided polymer in any suitable blending apparatus.

One suitable method incorporation of the chemical stabilizers is by blending a dry solid stabilizer into the plastic polymer, while the latter is being kneaded as on heated rolls or through an extruder.

The shell or investment mold is prepared in accordance with procedures well known in the art by applying to the oxymethylene polymer pattern to a suitable mold, forming composition of various types known in the art. In a shell molding process, for example, the mold-forming composition may be an aqueous slurry of a refractory material which acts as an inert filler and helps to control the viscosity, e.g., silica glass, silica flour, plaster, or a refractory clay, such as kaolin or victoria ball clay and a wetting agent such as an anionic surface active agent. The mold-forming composition may also contain other ingredients such as a colloidal silica as a binder, an organic bonding agent, e.g., a colloidal thickener such as gum arabic or methyl cellulose, a ceramic slip conditioner such as tartaric acid, a small amount of an organic solvent such as methylethyl ketone to aid in the drying of the applied coats and a de-airing agent such as 2-ethyl hexanol. When preparing a shell mold, the pattern is dipped into the mold-forming composition a sufficient number of times, with drying in between, to build up the requisite shell thickness. In some cases, it is beneficial to use one type of composition for the initial dip coating, e.g., containing a relatively small amount of clay and colloidal silica, and another type of composition for subsequent dip coatings, e.g., containing somewhat larger amounts of clay and colloidal silica. Moreover, when using a glass silica-based shell, it is usually beneficial to "stucco" the coating with glass silica powder after one or more dip coatings, and before drying.

After the mold is fully formed, molten metal is poured into it in the usual way to form a casting having a high degree of accuracy. The mold is removed from the casting after it has been fully solidified and cooled, for example, by lightly tapping with a hammer in the case of glass based shell molds or by knock-out of the flask with an air hammer in the case of investment mold.

The process in the invention, wherein an oxymethylene polymer is substituted for wax in the "lost wax" process, has the important advantage that the oxymethylene polymer may be removed from the mold during firing with a minimum of carbonization at relatively low temperatures, e.g., 270 to 350° C. When wax or another organic material (containing little or no oxygen in its molecular structure) is used, it is extremely difficult to obtain removal of the pattern without significant carbonization at moderate temperature levels. The presence of significant amounts of carbon in the interior of the mold adversely affects the accuracy of shape of the casting and may have an undesirable effect on the chemical and physical structure of the coating due to the formation of carbides or carbon alloys. At the same time, the oxymethylene polymer releases formaldehyde which maintains a desirable reducing atmosphere at the surface of the metals.

Another advantage of the process of this invention is that because of the hardness and toughness of the oxymethylene polymer, the pattern may be prepared, stored and moved with substantially less chance of damage due to nicks, scrapes, etc., to which patterns, made from a relatively soft material such as wax may be subjected in the course of normal handling.

Still another advantage of the process is that drying times can be substantially reduced through the use of elevated drying temperatures, in view of the low coefficients of expansion of oxymethylene polymers. When wax is used as the pattern, elevated drying temperatures must be avoided because of the relatively high coefficient of expansion of wax.

The process of this invention may be used in the preparation of castings of relatively complicated shape made from metals such as those based on major amounts of titanium, selenium, bronze, gold, aluminum, nickel, and cast iron. By means of the process, castings may be prepared, for example, of the following articles: cores, inlays, turbine blades, turbine brackets, gears.

In a specific embodiment of the invention, a copolymer of trioxane and 2 wt. percent of ethylene oxide based on the weight of the monomeric mixture is heat treated to remove 5–10% oxymethylene groups at the end of the polymer chains. After incorporating a thermal stabilizer, the polymer is injection molded into the shape of a gear. The molding is cleaned and is then dipped into a stirred initial mold-forming composition consisting of a powder made up of 97.5% by weight of 325 mesh silica glass and 65 mesh victoria ball clay and the following additional materials per 100 grams of this powder: 15 cc. of an aqueous solution of 10 grams of gum arabic per 100 cc. of solution, 1.5 cc. of an aqueous solution of 50% by weight of tartaric acid, 5 cc. of an aqueous suspension containing 35% by weight of colloidal silica, 0.1 cc. of a 75% by weight aqueous solution of dioctyl sodium sulfosuccinate anionic surface active agent, and 8.5 cc. of water. After 2½ to 3½ minutes during which a gel forms in the coating, the pattern is stuccoed with silica glass grain of 35 to 80 mesh size by raining the grain onto the pattern through a 30 mesh screen, and the grained coating is allowed to dry at room temperature, i.e., 20–30° C. The pattern is then dipped for 4 to 5 seconds into a "back-up" composition consisting of a powder made up of 94% by weight of 325 mesh silica and 6% by weight of kaolin and the following additional materials per 100 grams of powder: 0.1 cc. of an aqueous solution of 75% by weight of dioctyl sodium sulfosuccinate, 27.2 cc. of an aqueous suspension of 35% by weight of colloidal silica, 8.15 cc. of methyl ethyl ketone, 8.15 cc. of water and 0.08 cc. of 2-ethyl hexanol. After partial drying, the pattern is stuccoed with 35 to 50 mesh silica glass grain. The latter coating and stuccoing procedure is repeated 2–6 times except that the subsequent stuccoing steps are carried out with silica glass grain of 10 to 35 mesh size.

The mold is then placed in a furnace upside down, i.e., with the sprue cup on the bottom, and fired for 20–30 minutes at 1,000° C.

The resulting mold, after preheating to 800–900° C., is used to make an accurate casting of "Stellite 21," a commercial abrasion resistant cobalt base alloy containing 25.5 to 29% of chromium, 5 to 6% molybdenum, 0.2 to 0.3% of carbon, a maximum 1% manganese, a maximum of 2% iron, a maximum of 1% of silicon, a maximum of 0.007% of boron and the balance cobalt. After cooling, the mold is removed from the coating by tapping lightly with a hammer.

It is to be understood that the foregiong detailed description is given merely by way of illustration and that many variations may be made therein without departing from the spirit of our invention.

Having described our invention, what we desire to secure by Letters Patent is:

1. A process comprising forming a pattern from a moldable oxymethylene polymer, covering the pattern with a refractory mold-forming composition, and subjecting the covered pattern to an elevated temperature to remove the polymer and form a mold.

2. The process of claim 1 wherein said oxymethylene polymer contains repeating carbon-to-carbon bonds in the main polymer chain.

3. The process of claim 2 wherein said polymer is an oxymethylene cyclic ether copolymer containing from 75 to 99.6 mol percent of recurring oxymethylene units, said cyclic ether having at least two adjacent carbon atoms.

4. The process of claim 3 wherein said copolymer has a structure comprising recurring units having the formula

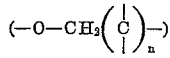

wherein $n$ is an intgeer from zero to 5 and wherein $n$ is zero in from 75 to 99.6 percent of the recurring units.

5. The process of claim 4 wherein said copolymer is a copolymer of trioxane and a cyclic ether having at least two adjacent carbon atoms, said copolymer containing from 75 to 99.6 mol percent of recurring oxymethylene units.

6. The process of claim 4 wherein said cyclic ether has the structure

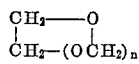

where $n$ is an integer from zero to 2, said copolymer containing from 75 to 99.6 mol percent of recurring oxymethylene units.

7. A process comprising forming a pattern from a moldable oxymethylene polymer, covering the pattern with a refractory mold-forming composition, and subjecting the covered pattern to an elevated temperature to remove the polymer and form a mold and then pouring molten metal into the mold to form a casting, and removing the mold from the casting.

8. In the process of forming a pattern from a resinous substance, covering the pattern with a refractory mold forming composition, and subjecting the covered pattern to an elevated temperature to remove the polymer and form a mold, the improvement which consists of employing as said resinous substance a moldable oxymethylene polymer.

References Cited by the Examiner
UNITED STATES PATENTS

| | | | |
|---|---|---|---|
| 2,456,424 | 12/48 | Neiman | 22—196 |
| 2,989,506 | 6/61 | Hudgin et al. | 260—67 |
| 2,989,507 | 6/61 | Hudgin et al. | 260—67 |
| 3,027,352 | 3/62 | Walling et al. | 260—67 |

OTHER REFERENCES

"Organic Chem.," Furon and Snyder, pp. 66 and 67, edition of 1942.

MICHAEL V. BRINDISI, *Primary Examiner.*

MARCUS U. LYONS, *Examiner.*